United States Patent [19]

Erickson

[11] 4,198,218
[45] Apr. 15, 1980

[54] GAS SEPARATION APPARATUS

[75] Inventor: John W. Erickson, Huntington Beach, Calif.

[73] Assignee: Kobe, Inc., City of Commerce, Calif.

[21] Appl. No.: 23,208

[22] Filed: Mar. 23, 1979

[51] Int. Cl.² .......................................... B01D 45/12
[52] U.S. Cl. ................................. 55/408; 55/257 C; 55/317; 55/400; 55/471
[58] Field of Search ............... 55/90, 257 R, 257 C, 55/317, 345, 400, 408, 471

[56] References Cited

U.S. PATENT DOCUMENTS

| 940,103 | 11/1909 | Feld | 55/345 X |
|---|---|---|---|
| 2,031,734 | 2/1936 | Riebel, Jr. et al. | 55/317 |
| 2,790,508 | 4/1957 | Allander et al. | 55/345 |
| 3,224,173 | 12/1965 | Webb | 55/408 |
| 3,240,003 | 3/1966 | Stroup et al. | 55/408 |
| 4,118,207 | 10/1978 | Wilhelm | 55/345 X |

FOREIGN PATENT DOCUMENTS 473574  5/1951  Canada ..................................... 55/408

Primary Examiner—Richard L. Chiesa
Attorney, Agent, or Firm—William C. Norvell, Jr.

[57] ABSTRACT

A gas separation apparatus is provided for removing moistened particles from a stream of air by subjecting the moistened particle laden air stream to centrifugal force to separate the moistened particles from the air stream and thence separating the water from the particles and finally causing the air stream to pass to an outlet through a mechanical separator assembly to remove any particles still remaining therein.

6 Claims, 3 Drawing Figures

GAS SEPARATION APPARATUS

BACKGROUND OF THE INVENTION

1. Field of the Invention

The invention relates generally to a gas separation apparatus and more specifically to an apparatus for removing moistened particles from a transient gas stream to obtain a supply of clean gas.

2. Description of the Prior Art

Previous attempts to clean dust or dirt laden air have employed cyclone separators, filter separators, and electrostatic precipitation type apparatuses. Cyclone separators are typically somewhat inefficient and require considerable recycling of the gas being treated to obtain any degree of efficiency in removing particulate contaminants. The same general inefficiencies are experienced with filter separators, coupled with the attendant requirement of changing or reconditioning the filter media. Electrostatic precipitator type separators, while considerably efficient in removing particulate contaminants from a transient gas stream, are large in size and require considerable quantities of electrical energy to perform properly.

SUMMARY OF THE INVENTION

A method is provided for removing particulate contaminants from a transient gas stream by moistening the contaminants, separating the moistened particles from the gas stream by centrifugal force, and passing the gas stream through a mechanical separator to remove additional particles.

A gas separator apparatus is provided comprising a generally cylindrical housing rotatable about its central axis and defining a main separating chamber. A dirty gas inlet communicates with the interior of the housing. Means within the housing are defined for increasing the radial velocity of the dirty gas introduced into the housing through the inlet. Stationary fluid intake passage means extend radially outwardly of the central axis of the housing and into the main separating chamber, the passage means including a fluid intake opening at the outermost end thereof, and a fluid outlet in communication with the opposite end thereof. Stationary particulate intake passage means extend radially outwardly of the central axis of the housing into the main separating chamber, the passage means including a particulate intake opening at the outermost end thereof, and a particulate outlet in communication with the opposite end thereof. A clean gas outlet is defined with an impingement plate separator disposed between the interior of the housing and the clean gas outlet for mechanically removing liquid drops containing particulate matter from the gas being treated.

DESCRIPTION OF THE PREFERRED EMBODIMENTS

Figure 1:
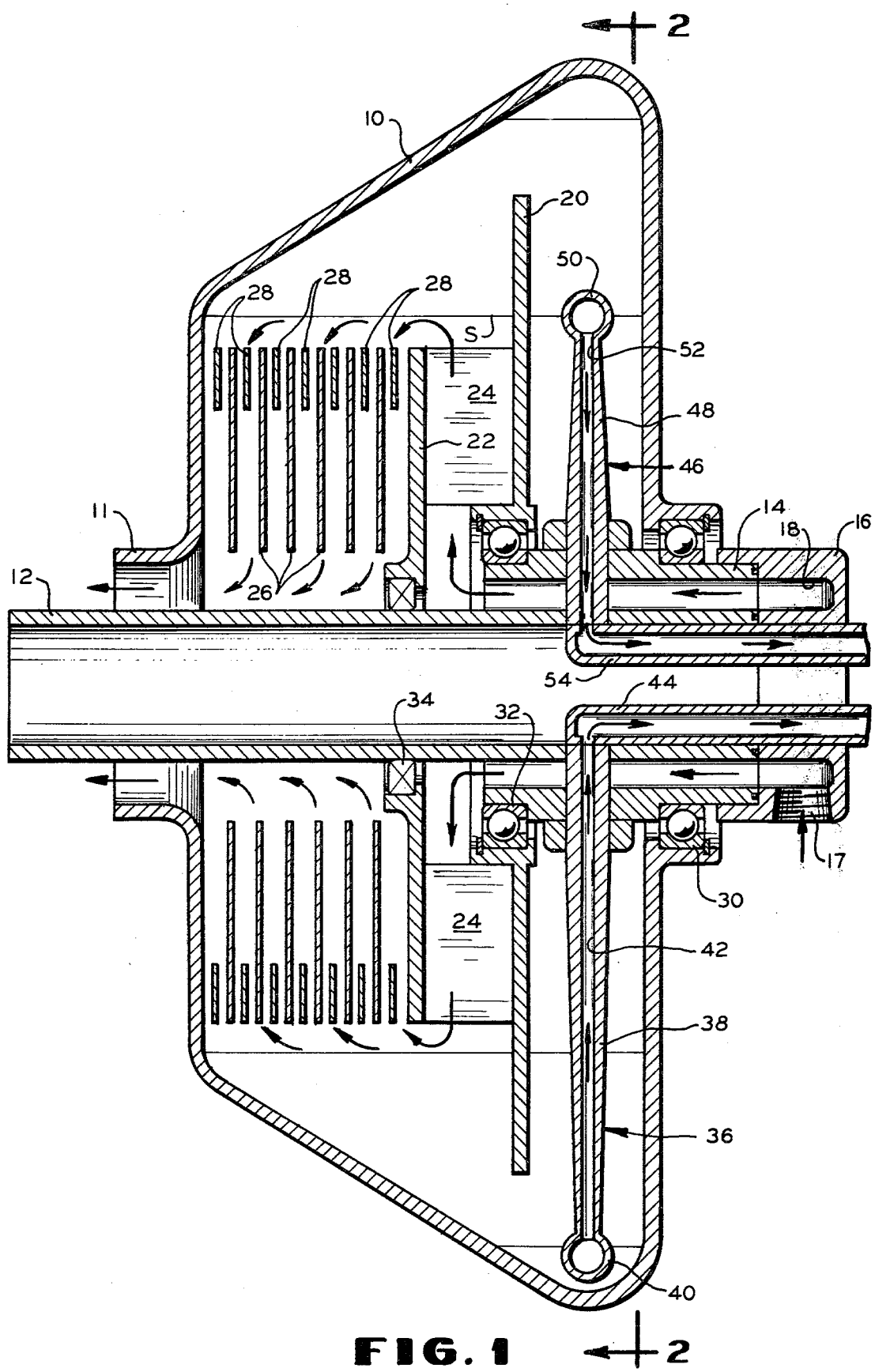
FIG. 1 is a sectional view of a gas separating apparatus incorporating the features of the invention.
Figure 2:
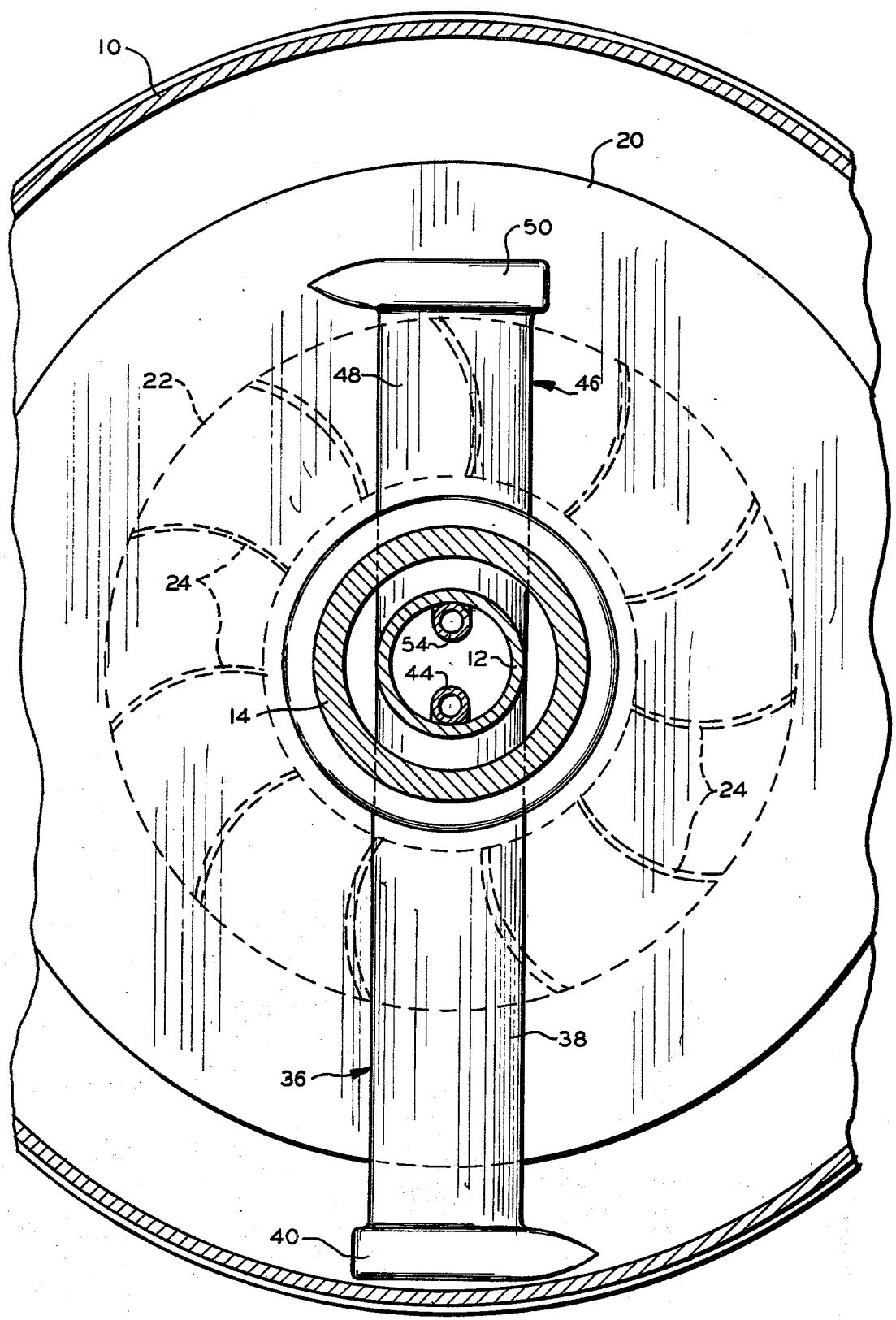
FIG. 2 is a sectional view of the apparatus illustrated in FIG. 1 taken along line 2—2 thereof.

Referring to FIGS. 1 and 2, there is shown a gas separating apparatus having a housing or casing 10 mounted to rotate relative to a fixed hollow internal cylinder 12. The housing 10 may have a tapering wall which typically tapers toward a clean gas outlet 11 at one end thereof. Another hollow outer cylinder 14 is mounted in spaced coaxial relation about the cylinder 12 and is suitably affixed to the cylinder 12 by an end member 16 having an inlet 17 communicating with an annular channel or passageway formed between the outer peripheral wall of the internal cylinder 12 and inner peripheral wall of the outer cylinder 14. The end member 16 may be sealingly affixed to the respective ends of the inner cylinder 12 and the outer cylinder 14 by any suitable means such as by welding, threaded engagement, or the like.

A radially extending generally planar annular dividing wall 20 is disposed within the interior of the housing 10. A second radially extending generally planar annular dividing wall 22 is axially spaced from the dividing wall 20. An annular array of fan impeller blades 24 are integral with and extend between the adjacent facing surfaces of the dividing walls 20 and 22.

An array of annular impingement plates 26 and 28 is arranged to extend coaxially of the internal cylinder 12. In the illustrated embodiment, the impingement plates all have the same outer diameter, but the plates 26 have a smaller internal diameter than the plates 28 and thus contain a greater surface area. The plates 26 and 28 are maintained in fixed relation between the facing surfaces of the inner surface of one end of the housing 10 containing the clean gas outlet 11, and the adjacent facing surface of the dividing wall 22 by suitable bracketing, not shown.

The housing 10 is rotatably supported on the outer cylinder 14 by a pair of spaced apart bearing assemblies 30 and 32. The bearing assembly 30 is positioned between an outwardly flared terminal portion of the end wall of the housing 10 and an associated portion of the outer surface of the outer cylinder 14, while the bearing assembly 32 is positioned between an outwardly flared terminal inner portion of the dividing wall 20 and an associated portion of the outer surface of the outer cylinder 14.

A fluid-tight rotary seal 34 is disposed between the annular inner edge of the annular dividing wall 22 and the outer wall of the fixed cylinder 12. Typically, the rotary seal 34 is affixed to the inner edge of the dividing wall 22 and is adapted to rotate therewith relative to the cylinder 12.

Within the internal chamber of the housing 10, there is a first pickup element 36 which includes a radially extending arm portion 38 and a generally circumferentially extending head portion 40 at the outer end of the arm. The pickup element 36 is stationarily mounted to extend through the cylinders 12 and 14 and has its internal passageway 42 in communication with an outlet pipe 44 disposed within the interior of the hollow cylinder 12. The pickup head 40 has a circular intake opening at its leading end which extends forwardly of the leading edge of the arm portion 38 for optimum efficiency.

Diametrically opposed from the first pickup element 36 and disposed within the internal chamber of the housing 10 is a second pickup element 46 which includes a radially extending arm portion 48 and a generally circumferentially extending head portion 50 at the outer end thereof. The pickup element 46 is stationarily mounted within the housing 10 and is adapted to extend through the cylinders 12 and 14 and has its internal passageway 52 in communication with an outlet pipe 54 disposed within the interior of the hollow cylinder 12. The pickup head 50 has a circular intake opening at the leading end thereof which extends forwardly of the leading edge of the arm portion 48 for optimum efficiency. It will be noted that the length of the radial arm 48 of the pickup element 46 is radially shorter than the corresponding arm portion 38 of the pickup element 36. As will become manifest during the description of the operation of the apparatus, the pickup element 36 is employed to receive and conduct away particulate material fraction which collects in the chamber of the housing 10 adjacent the outer peripheral portion thereof, while the pickup element 46 is employed to receive and conduct away the liquid fraction collected within the internal chamber of the housing 10 radially inwardly of the particulate fraction.

Figure 3:
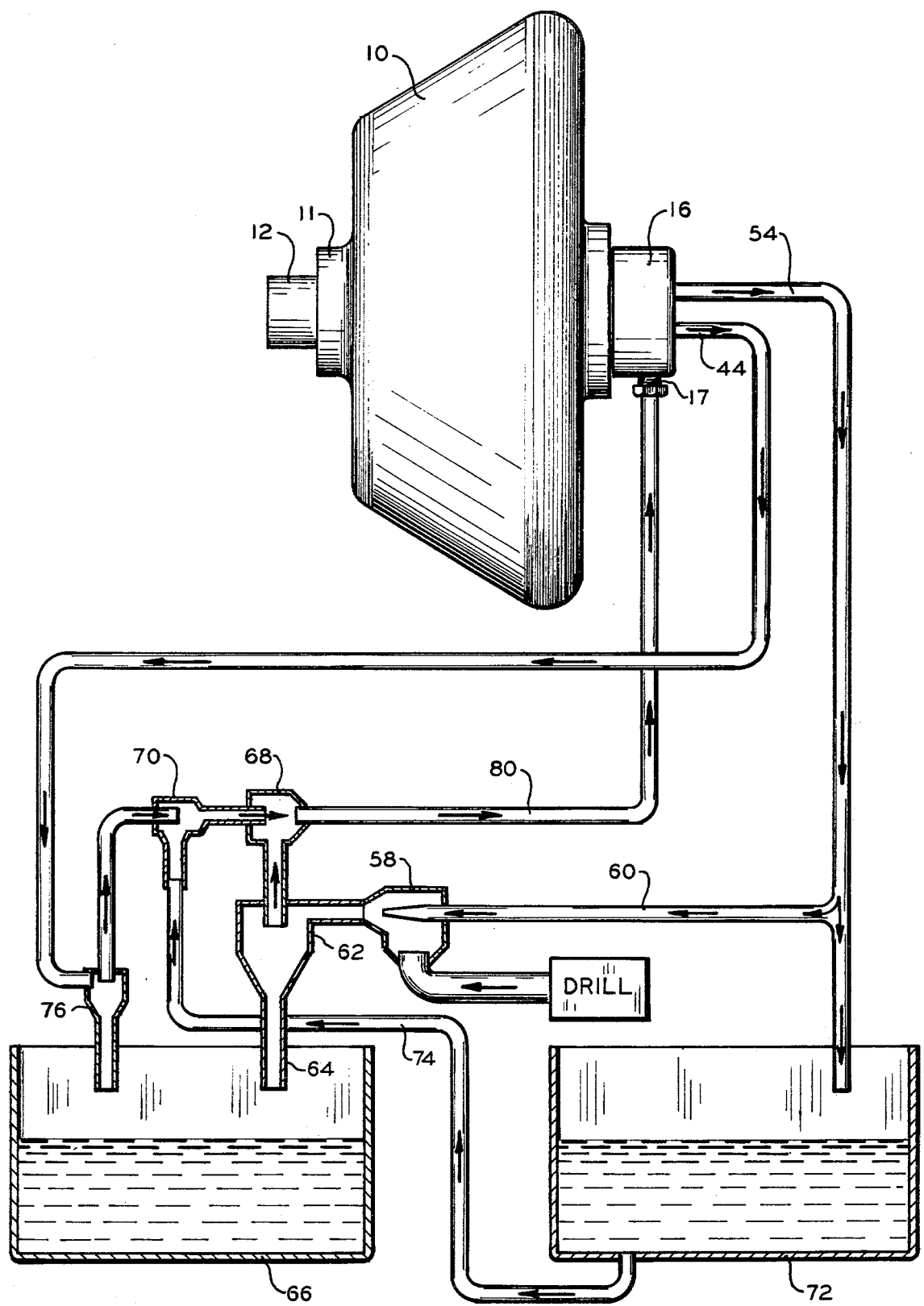
FIG. 3 is a schematic view of a system for utilizing the apparatus illustrated in FIGS. 1 and 2 for cleaning a stream of particulate containing gas.

It will be understood that the apparatus thus far described is useful for removing suspended solids from air and providing clean air for any desired ultimate use. One source of air to be cleaned could be from underground mining or drilling operations, for example, where it is desired to remove the suspended rock dust particles entrained in the air. It has been found that the dust particles can be most efficiently removed from the air stream by initially moistening the dust particles and thereafter introducing the air with the moistened dust particles suspended therein into the apparatus illustrated in FIGS. 1 and 2. FIG. 3 illustrates, in rather schematic form, a typical system for moistening the particles in the stream of dirty air to be treated prior to the introduction thereof into the apparatus illustrated in FIGS. 1 and 2. Also, the system of FIG. 3 discloses the manner in which the water used in the system may be recycled to increase the overall economic efficiency of the system.

Before considering the specific elements of the system illustrated in FIG. 3, it is believed appropriate to explain the operation of the apparatus illustrated in FIGS. 1 and 2. Referring once again to the apparatus illustrated in FIGS. 1 and 2, in operation, a motor is drivingly coupled to the housing 10 to a speed which may attain in excess of 3,000 rpm. The dirty gas to be treated which contains moistened particulate contaminants is introduced into the system through the inlet 17. The dirty air is then caused to pass axially along the outer peripheral surface of the cylinder 12 until it reaches the "eye" of a fan comprised of the annular array of impeller blades 24. The rotating array of impeller blades 24 functions to, in effect, throw the dirty gas being treated radially outwardly and increase the velocity thereof. While the velocity of the dirty gas being treated is increased by the operation of the fan structure, centrifugal force induced by the rotating housing 10 forces the moistened particles within the gas stream to the outer extremities of the inner peripheral surface of the housing 10 and will tend to completely fill the interior chamber of the housing 10 to the annular zone S. Due to the centrifugal force caused by the rotating chamber 10, the moisture and particulate material are separated from one another. Since the particulate material is caused to travel radially outwardly along the inclined inner surface of the housing 10 and concentrate within an outer annular zone, it will be understood that simultaneously the liquid fraction tends to accumulate radially inwardly of the concentrated particulate fraction.

Since the housing 10 is rotating in a direction opposite to the inlet opening of the head 40 of the pickup element 36, the inlet opening will "inhale" the particulate material which is continuously collected in the outer peripheral radial portions of the internal chamber of the housing 10 and conduct the same through the internal passage 42 to the outlet pipe 44. Simultaneously, the inlet opening of the pickup head portion 50 of the pickup element 46 will "inhale" the liquid fraction of the separated solid fraction and liquid fraction and cause the same to be transmitted through the internal passageway 52 to the outlet pipe 54.

The clean air is caused to then be directed to a path 180° in opposition to the path thereof, travel through the fan blades 24 and is forced to pass between the array of impingement plates 26 and 28 and thence to the clean gas outlet 11 of the housing 10. It will be understood that, as the direction of the clean air is radically changed, the energy of the particulate contaminants remaining therein will be substantially reduced and will be caused to impinge a surface of one or more of the impingement plates 26 and 28. Since the energy and velocity of the particles within the impingement plates 26 and 28 will be substantially reduced, the centrifugal force caused by the rotating housing 10 and the associated impingement plates 26 and 28 cause the particles therein to be forced radially outwardly and into the outer extremities of the internal chamber of the housing 10 and be caused to be finally removed therefrom through the pickup element 36.

With reference now to the system illustrated in FIG. 3 which is effective to moisten the particulate contaminants in the gas stream to be treated and also to recycle the moistening liquid after it has been removed from the particulate contaminants by the apparatus illustrated in FIGS. 1 and 2. Initially, the dirty gas to be treated is introduced into a jet pump 58 wherein the particles are wetted by liquid received from an outlet conduit 60 in communication with the outlet pipe 54 of the apparatus illustrated and described in connection with FIGS. 1 and 2. The outlet of the jet pump 58 is in communication with the inlet 60 of a cyclone separator 62 which functions to remove the heaviest of the particles in the gas stream being treated which are discharged through the particulate outlet 64 of the cyclone separator 62 into a container assembly 66 for the removed particulate material.

The treated gas stream with the moistened particulate contaminants suspended therein are discharged through the outlet of the cyclone separator 62 to the inlet of a jet pump 68 which is operative to further wet the particulate material in the transient gas stream. The jet pump 68 receives moisture from an associated jet pump 70, coupled to a clean water tank 72 through a conduit 74. Also, the jet pump 70 communicates with the outlet of a cyclone separator 76, the inlet of which is connected to the outlet pipe 44 of the apparatus illustrated in detail in FIGS. 1 and 2. The outlet pipe 44 conducts away the particulate material which has been separated within the apparatus of FIGS. 1 and 2, which is typically in the form of a slurry containing some liquid. Accordingly, prior to the discharge of the particulate material from the outlet pipe 44 into the solids container 66, the slurry containing particulate material is applied to the centrifugal force action of the cyclone separator 76 which functions to remove an additional quantity of liquid from the transient particles. The liquid, thus removed, is introduced through the outlet thereof to the inlet of the jet pump 70.

The transient gas stream being treated with the moistened particulate material is then introduced into the inlet 17 of the apparatus of FIGS. 1 and 2 through an inlet pipe 80, whereupon the separating and cleaning action, as described above, occurs.

There may be other systems employed for applying moisture to the particulate material in the gas to be treated, and the system illustrated and described in FIG. 3 is illustrative of a system which successfully will achieve the desired objectives.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A gas separator apparatus comprising: a generally cylindrical housing rotatable about a central axis and defining a main separating chamber; a dirty gas inlet communicating with the interior of said housing; means within said housing for increasing the radial velocity of the dirty gas introduced into said housing through said gas inlet; stationary fluid intake passage means extending radially outwardly of the central axis of said housing into the main separating chamber, said passage means including a fluid intake opening at the outermost end thereof, and a fluid outlet in communication with the opposite end thereof; stationary particulate intake passage means extending radially outwardly of the central axis of the housing into the main separating chamber, said passage means including a particulate intake opening at the outermost end thereof, and a particulate outlet in communication with the opposite end thereof; a clean gas outlet; and an impingement plate separator disposed between the interior of said housing and said clean gas outlet for mechanically removing particles from the gas being treated.

2. The invention defined in claim 1 wherein said particulate intake opening is disposed in the region of the periphery of said housing.

3. The invention defined in claim 1 wherein said impingement plate separator includes an annular array of spaced apart plates.

4. The invention defined in claim 3 wherein said separator is rotatable with said housing.

5. The invention defined in claim 3 wherein said plates are planar and are generally normal to the axis of rotation of said housing.

6. The invention defined in claim 1 wherein the fluid intake opening of said fluid intake passage means and the particulate intake opening of said particulate intake passage means extend in a direction opposite to the direction of rotation of said housing.

* * * * *